United States Patent
Bao et al.

(10) Patent No.: US 7,027,519 B2
(45) Date of Patent: Apr. 11, 2006

(54) ITERATIVE MAXIMUM LIKELIHOOD CHANNEL ESTIMATION AND SIGNAL DETECTION FOR OFDM SYSTEMS

(75) Inventors: Jay Bao, Vista, CA (US); Pei Chen, San Diego, CA (US); Hisashi Kobayashi, New Brunswick, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 973 days.

(21) Appl. No.: 09/796,124

(22) Filed: Feb. 28, 2001

(65) Prior Publication Data

US 2002/0150037 A1 Oct. 17, 2002

(51) Int. Cl.
*H04L 23/02* (2006.01)
(52) U.S. Cl. .................. 375/260; 375/262; 375/341
(58) Field of Classification Search ............... 375/260, 375/262, 340, 341
See application file for complete search history.

(56) References Cited

U.S. PATENT DOCUMENTS

| | | | | |
|---|---|---|---|---|
| 5,912,876 | A | 6/1999 | H'mimy | 370/203 |
| 6,141,393 | A | 10/2000 | Thomas et al. | 375/347 |
| 6,477,210 | B1* | 11/2002 | Chuang et al. | 375/340 |
| 6,614,857 | B1* | 9/2003 | Buehrer et al. | 375/340 |
| 6,654,429 | B1* | 11/2003 | Li | 375/316 |
| 6,674,820 | B1* | 1/2004 | Hui et al. | 375/346 |
| 6,700,919 | B1* | 3/2004 | Papasakellariou | 375/130 |
| 6,768,713 | B1* | 7/2004 | Siala et al. | 370/203 |

OTHER PUBLICATIONS

Ye Li, "Pilot-Symbol-Aided Channel Estimation for OFDM in Wireless Systems"; IEEE Transactions on Vehicular Technology, vol. 49, No. 4, Jul. 2000.

Hoeher, et al., "Two-Dimensional Pilot-Symbol-Aided Channel Estimation by Wiener Filtering"; Proceedings 1997 IEEE International Conference on Acoustics, Speech and Signal Processing, Munich, Germany, Apr. 1997, pp. 1845-1848.

Edfors et al.; "OFDM Channel Estimation by Singular Value Decomposition"; IEEE Transactions on Communications, vol. 46, No. 7, Jul., 1998.

Moon et al.; "Performance of Channel Estimation Methods for OFDM Systems in a Multipath Fading Channels"; IEEE Transactions on Consumer Electronics, vol. 46, No. 1, Feb. 2000, pp. 161-170.

(Continued)

*Primary Examiner*—Jay K. Patel
*Assistant Examiner*—David B. Lugo
(74) *Attorney, Agent, or Firm*—Dirk Brinkman; Andrew J. Curtin

(57) ABSTRACT

In orthogonal frequency division multiplexing systems, iterative maximum likelihood channel estimation and signal detection is preformed. The channel estimation gives the maximum likelihood estimates of time domain channel parameters. A cost function is defined. An iterative process estimates a joint channel impulse response and a transmitted signal that minimize the cost function, and thus solves the channel estimation and signal detection problem jointly without having specific knowledge of the channel.

16 Claims, 7 Drawing Sheets

OTHER PUBLICATIONS

Said et al.; "Linear Two-Dimensional Pilot Assisted Channel Estimation for OFDM Systems"; pp. 32-36.

Ye Li et al.; "Robust Channel Estimation for OFDM Systems with Rapid Dispersive Fading Channels"; IEEE Transactions of Communications, vol. 46, No. 7, Jul. 1998.

Leonard J. Cimini, Jr., "Analysis and Simulation of a Digital Mobile Channel Using Orthogonal Frequency Division Multiplexing"; IEEE Transactions on Communications, vol. Com-33, No. 7, Jul., 1985. pp. 665-675.

* cited by examiner

ITERATIVE MAXIMUM LIKELIHOOD CHANNEL ESTIMATION AND SIGNAL DETECTION FOR OFDM SYSTEMS

FIELD OF THE INVENTION

This invention relates generally to wireless communications, and more particularly to estimating impulse responses of channels in OFDM systems, and detecting signals in the estimated channels.

BACKGROUND OF THE INVENTION

Radio signals in wireless communication systems are subject to frequency and time selective fading. These problems are caused by multipath propagation and Doppler shifts in wireless channels. Orthogonal Frequency Division Multiplexing (OFDM) is one technique for transmitting signals (symbols) at high bit rates while minimizing these problems, see Cimini, "*Analysis and simulation of a digital mobile channel using orthogonal frequency division multiplexing*" IEEE Trans. on Comm., COM-33, pp. 665–675, July 1985.

OFDM systems split the symbols over parallel low bitrate sub-channels using frequency multiplexing with a minimum frequency spacing to achieve orthogonality. OFDM is inherently robust against frequency selective fading because each of the narrow band sub-channels occupies only a small portion of the total spectrum where the frequency response of the sub-channel is, for practical purposes, locally flat.

The robustness against multipath interference also comes from the presence of a guard interval separating adjacent OFDM symbols. If the channel delay spread is less than the guard interval, then intersymbol interference (ISI) will not affect the actual OFDM symbol. The guard interval can be discarded at the receiver.

Channel estimation has a substantial influence on the overall performance of the system. In the absence of channel information, differential detection is usually used at the expense of a 3 to 4 dB loss in signal to noise ratio (SNR) compared to coherent detection, see Li et al. "*Robust channel estimation for OFDM systems with rapid dispersive fading channels,*" IEEE Trans. on Comm., vol. 46, pp. 902–915, July 1998.

To make coherent detection possible, an efficient channel estimation process is necessary. Insertion of pilot signals in OFDM provides a base for reliable channel estimation. One class of pilot assisted estimation processes uses fixed parameter linear interpolation, see Said et al. "*Linear two dimensional pilot assisted channel estimation for OFDM systems,*" 6th IEEE Conf. on Telecommunications, pp. 32–36, 1998, and Moon et al. "*Performance of channel estimation methods for OFDM systems in a multipath fading channels,*" IEEE Trans. on Consumer Electronics, vol. 46, No. 1, pp. 161–170, February 2000. These processes are very simple in implementation, however, large estimation errors are inevitable in case of a mismatch.

Optimal and sub-optimal linear one-dimensional (1-D), double 1-D, and two-dimensional (2-D) estimators in the minimum mean-squared error (MMSE) sense have also been described for pilot assisted channel estimation in terrestrial audio and television broadcasting, and fixed and mobile wireless communications, see Edfors et al. "*OFDM channel estimation by singular value decomposition,*" IEEE Trans. on Comm., vol. 46, pp. 931–939, July 1998, and Hoeher et al., "*Two-dimensional pilot-symbol-aided channel estimation by Wiener filtering,*" Proc. of IEEE Int. Conf. on Acoustics, Speech, and Signal Processing, ICASSP-97, vol. 3, pp. 1845–1848, 1997.

However, filtering requires the knowledge of the channel, such as the correlation function of the channel impulse response, which is usually unknown in wireless systems. Robust pilot assisted estimation schemes where channel statistics are matched to particular cases, are described by Edfors et al. in "*OFDM Channel Estimation by Singular Value Decomposition,*" IEEE Trans. on Comm., vol. 46, pp. 931–939, July 1998, and Li et al. in "*Pilot-symbol-aided channel estimation for OFDM in wireless systems,*" IEEE Trans. on Veh. Technol., vol. 49, No. 4, pp. 1207–1215, July 2000. However, there, robustness is obtained at the expense of performance loss.

U.S. Pat. No. 5,912,876 "Method and apparatus for channel estimation" to H'mimy describes a method for channel response estimation over a fast fading channel. A coded orthogonal frequency division modulated (OFDM) signal that includes main and pilot signal portions is generated. The coded signal is transmitted over the fading channel to a receiving unit where the main signal is detected, and an estimation of the frequency response of the fading channel is made using the coded pilot signals. The detected main signal and the estimated channel frequency response are used to estimate the main signal. The determination can be based on a channel inversion of the frequency response or new channel estimation combined with maximum likelihood sub-sequence estimation. The maximum likelihood sub-sequence estimation in H'mimy is used for choosing the most likely transmitted data sequence.

The H'mimy method requires that the transmitter codes both the data and the pilot signals. The method requires that the pilot signals are all ones. The estimation is based on the frequency response of the channel using only the pilot signals.

Therefore, there is a need for an improved method and system for channel estimation and signal detection for OFDM systems that do not necessarily rely on particularly coded pilot signals.

SUMMARY OF THE INVENTION

The invention provides an iterative maximum likelihood (ML) estimation method and system to estimate the impulse response of a multipath fading channel and to detect the transmitted signal in OFDM systems. The invention does not require any prior knowledge about the channel. The invention does not require any particular coding for the pilot signals, and an interactive estimation procedure uses both the pilot and main signals during channel estimation for improved performance.

The performance of the method according to the invention approaches the performance with true channel parameters. For a two-path or three-path slow fading channel, after only one iteration, the performance of the method reaches within 0.3 dB of the known channel case in terms of required SNR to achieve raw BER in the range of $10^{-1}$ to $10^{-2}$.

In greater detail, the invention provides a system and method which iteratively finds the joint channel impulse response and the transmitted signal to maximize the likelihood of estimating the correct main signal. The estimation procedure can start with an OFDM symbol with pilot signals. In this case, an initial maximum likelihood estimate of the impulse response of the channel is obtained from the pilot signals. Based on the initial estimate of the impulse response, a first estimation of the main signal is made. After the initial estimate, both the pilot signals and the estimated main signals are fed back to the channel estimation step to obtain an improved estimation of the channel's impulse response. Then, an updated estimation of the main signal can be obtained using the re-estimated channel impulse response. The iteration procedure stops when improvement on the channel estimation is below a predetermined threshold.

For OFDM symbols which do not include pilot signals, the iteration starts by assigning the initial estimation of the impulse response of the channel to be that of the final estimation of the previous OFDM symbol. The other iteration procedures follow those steps described in the previous paragraph.

DETAILED DESCRIPTION OF THE PREFERRED EMBODIMENT

We first give a brief description of an OFDM system that uses our invention, and then provide a detailed description of the method and system according to our invention.

OFDM System

Figure 1:
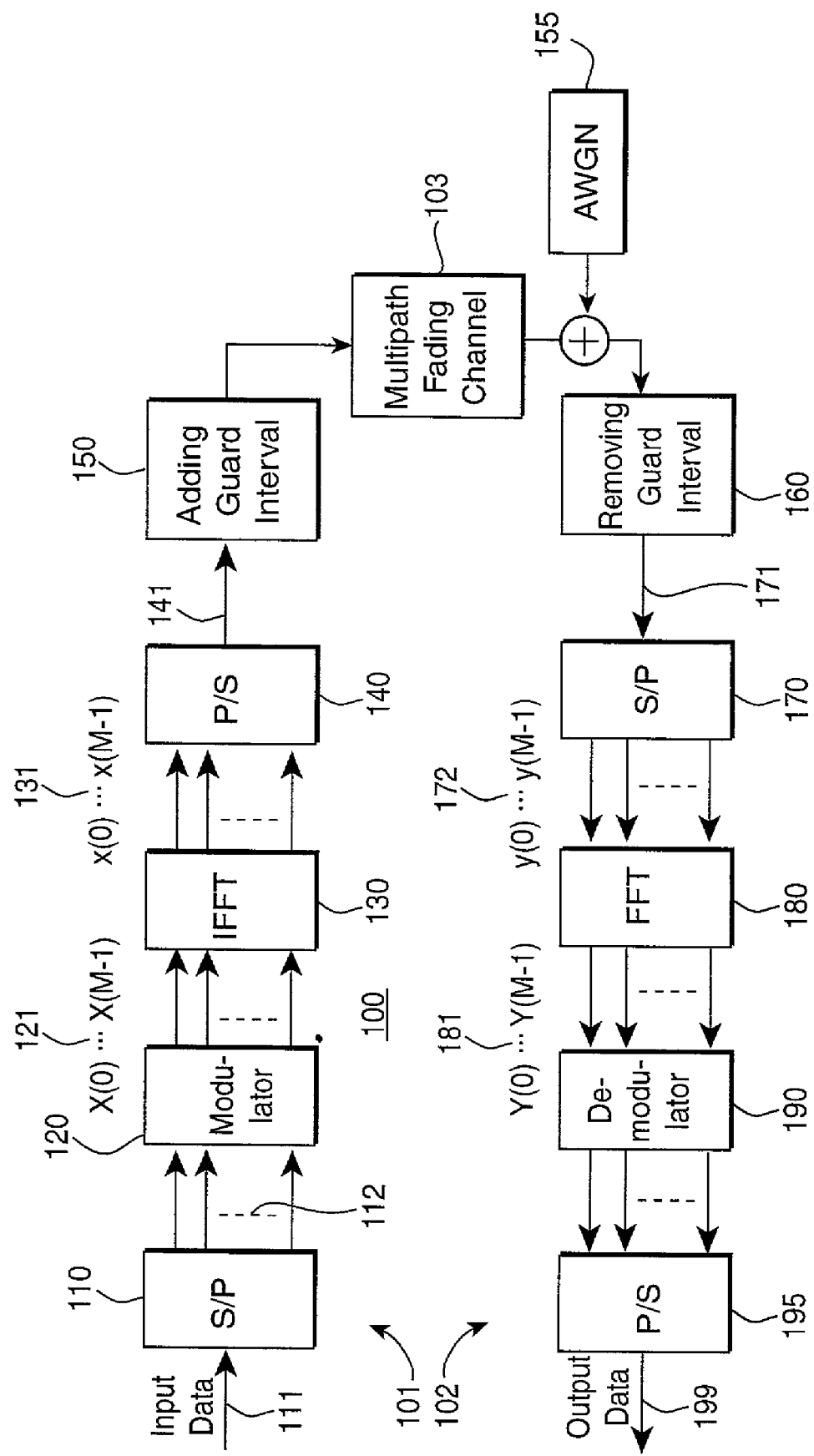
FIG. 1 is a block diagram of an OFDM system that can use the invention.

FIG. 1 shows a baseband equivalent representation of an OFDM system 100 that uses our invention. The system includes a transmitter 101 coupled to a receiver 102 by a wireless multipath fading channel 103. In the following description, we consider one OFDM symbol at a time for the reason justified below.

Each serial input data symbol of the input data 111 is converted 110 into M parallel data streams 112, where M is the size of the OFDM symbol. Each data stream is modulated 120 according to phase and amplitude modulation schemes, such as QPSK, 16QAM or 64QAM. The modulated complex data symbols X(0), . . . , X(M−1) 121 are transformed by an inverse fast Fourier transform (IFFT) 130, and the parallel outputs, x(0), . . . , x(M−1) 131 are converted 140 back to serial data (symbols) 141 for transmission. Guard intervals are inserted 150 between the symbols. The guard interval can include cyclic prefix pilot signals.

The OFDM symbols are transferred over the multipath fading channel 103 to the receiver 102. The frequency response (H) of the multipath fading channel represents the channel characteristics in the frequency domain, and the impulse response (h) represents the channel characteristics in the time domain. The channel is subject to additive white Gaussian noise (AWGN) 155.

In the receiver 102, the guard intervals are removed 160. When the intervals are longer than the spread of the channel delay, removing the guard intervals eliminates intersymbol interference (ISI) between OFDM symbols. Therefore, our system can be analyzed based on just one OFDM symbol. After converting 170 the serial data 171 to M parallel data streams, a spectral decomposition of the received symbols y(0), . . . , y(M−1) 172 is determined by a FFT 180, and the recovered complex data symbols, Y(0), . . . , Y(M−1) 181 are demodulated 190 and restored 195 in serial order to output data symbols 199.

Channel Model

The output of the multipath fading channel 103, that is the received signal, can be expressed as:

$$y(k) = \sum_{l=0}^{L-1} h_{l,k} x(k-l) + n(k), \qquad (1)$$

where L is the length of the channel memory, k–l is the channel response at symbol time k due to an impulse applied at symbol time $k_l$, and n(k) is the additive white Gaussian noise (AWGN) 155.

We assume that the fading in the channel 103 is slow, i.e., the channel is substantially constant during one OFDM symbol time. This assumption is valid as long as $f_d T \leq 0.01$ is satisfied, where $f_d$ is the maximum Doppler frequency, and T is the length of the OFDM symbol interval.

If the input data rate is R bits/second and the number of sub-channels is M, then for QPSK modulation, we have T=2M/R . For a transmitter or receiver moving at speed v, the maximum Doppler frequency is $f_d = f_c v/c$, where $f_c$ is the carrier frequency and c is the speed of light. With these assumptions, the relationship that we need to satisfy the slow fading assumption is:

$$M \leq 0.01 \times \frac{R}{2} \times \frac{c}{v} \times \frac{1}{f_c}. \qquad (2)$$

For example, if the data rate is 2 Mbps and the transmitter is traveling at 66 mph with respect to the receiver, and the carrier frequency is 1 GHz, then it is safe to assume a constant channel during one OFDM symbol time as long as we choose the number of sub-channels to be less than a hundred. Under the above assumption, our channel model can be expressed as:

$$y(k) = \sum_{l=0}^{L-1} h_l x(k-l) + n(k), 0 \leq k \leq M - 1. \qquad (3)$$

Maximum Likelihood Channel Estimation

Cyclic prefix pilot signals can be used for the guard intervals in order to avoid intercarrier interference in a multipath channel. The OFDM symbol with the cyclic prefix of length N can be written as:

x(−N), . . . , x(−n), . . . , x(−1), x(0), . . . , x(M−1), with x(−n)=x(M−n).

Since $$x(M-n) = \frac{1}{M}\sum_{m=0}^{M-1} X(m)\exp^{j2\pi\frac{(M-n)m}{M}} = \frac{1}{M}\sum_{m=0}^{M-1} X(m)\exp^{j2\pi\frac{(-n)m}{M}}, \quad (3)$$

for any $0 \leq k \leq M-1, 0 \leq l \leq L-1$, and $L-1 \leq N$ we have $$x(k-l) = \frac{1}{M}\sum_{m=0}^{M-1} X(m)\exp^{j2\pi(k-l)\frac{m}{M}}. \quad (4)$$

By substituting equations (3) and (4) into $$Y(m) = \sum_{k=0}^{M-1} y(k)\exp^{-j2\pi k\frac{m}{M}}, 0 \leq m \leq M-1, \quad (5)$$

we obtain $$Y(m) = \sum_{l=0}^{L-1} h_l \frac{1}{M}\sum_{i=0}^{M-1} X(i)\exp^{-j2\pi\frac{il}{M}}\sum_{k=0}^{M-1}\exp^{j2\pi\frac{k(i-m)}{M}} + N(m) \quad (6)$$

$$= \sum_{l=0}^{L-1} h_l \exp^{-j2\pi m\frac{l}{M}} X(m) + N(m), 0 \leq m \leq M-1, \quad (7)$$

where $N(0), \ldots, N(M-1)$ are the Fourier transform of $n(0), \ldots, n(M-1)$, which are independent and identically distributed (i.i.d.) Gaussian random variables.

Equation (7) can also be written in terms of the impulse response of the channel, which implies $$Y(m) = H(m)X(m) + N(m), \quad 0 \leq m \leq M-1. \quad (8)$$

Notice that equation (4) will not hold when the guard intervals do not use the cyclic prefix. Thus, Y(m) in equation (7) depends on X(m) and other X(i), where (i≠m).

Our goal is to estimate the impulse response of the channel 103. The channel frequency parameters $H(0), \ldots, H(M-1)$ are correlated. However, the impulse response parameters $h_0, \ldots, h_{L-1}$ are independent, and the number of parameters in the time domain is smaller than that in the frequency domain. Therefore, it is appropriate to apply a maximum likelihood (ML) approximation to equation (7), i.e., find the ML estimate of the channel's impulse response in the time domain.

According to the invention, we use the joint maximum likelihood estimation of the channel's impulse response and the estimated transmitted signal. To simplify notation, we use $\underline{X}$, $\underline{h}$ and $\underline{Y}$ to represent the estimated transmitted signal, the impulse response of the channel, and the received signal, respectively. The joint likelihood function of the received signal $\underline{Y}$ given $\underline{X}$ and $\underline{h}$ is $$f(\underline{Y}\mid\underline{X},\underline{h}) = \frac{1}{(2\pi\sigma^2)^M}\exp\left\{-\frac{\sum_{m=0}^{M-1}\left|Y(m) - \sum_{l=0}^{L-1} h_l\exp^{-j2\pi m\frac{l}{M}} X(m)\right|^2}{2\sigma^2}\right\}, \quad (9)$$

where $\sigma^2$ is the noise variance. We need to find $\underline{h}$ and $\underline{X}$ which jointly maximize $f(\underline{Y}|\underline{X}, \underline{h})$, or equivalently, we need to minimize a distance cost function $$D(\underline{h}, \underline{X}) = \sum_{m=0}^{M-1}\left|Y(m) - \sum_{l=0}^{L-1} h_l\exp^{-j2\pi m\frac{l}{M}} X(m)\right|^2. \quad (10)$$

Channel Estimation

Figure 2:
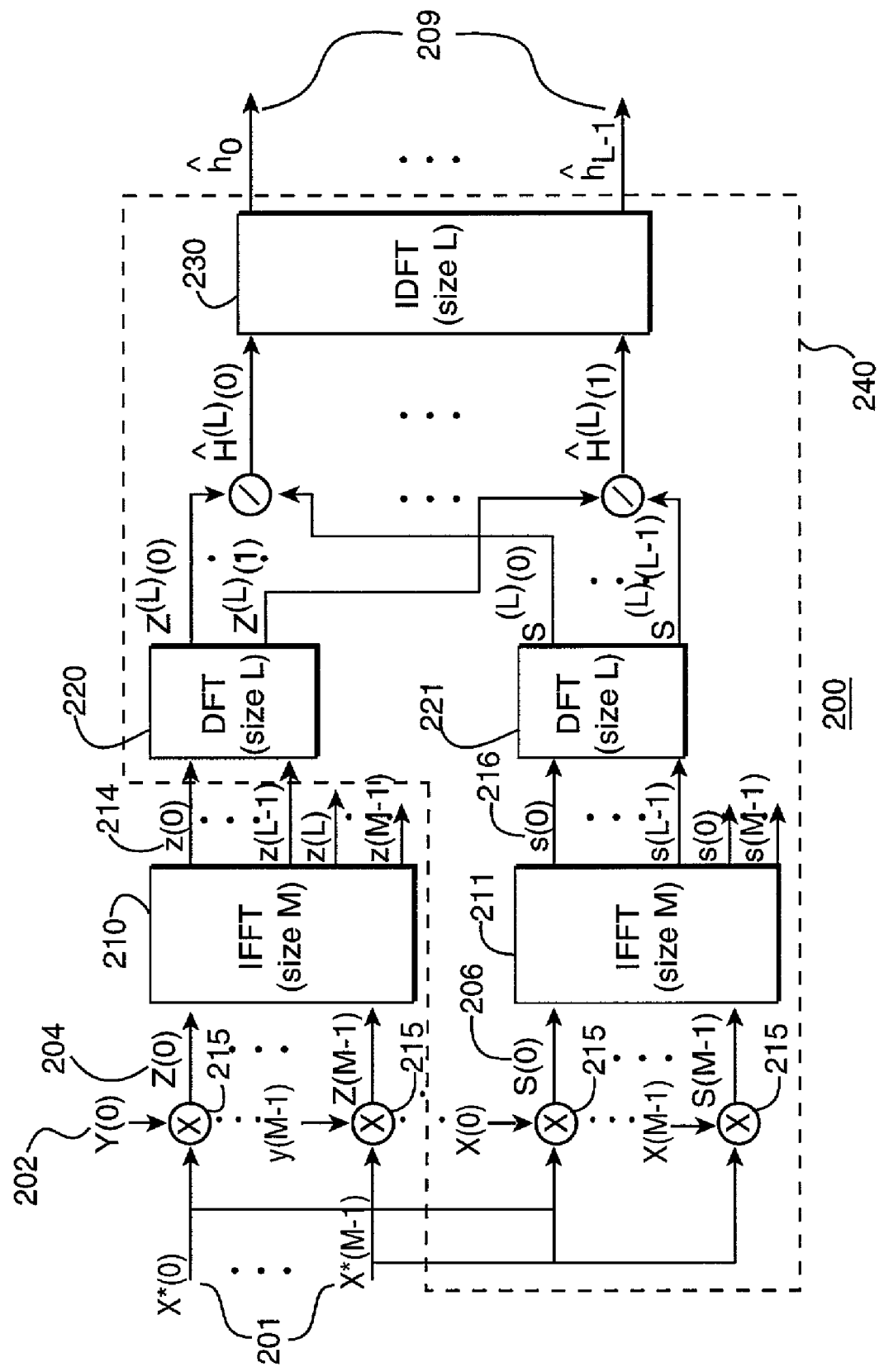
FIG. 2 is a block diagram of a channel estimation procedure according to the invention.

A maximum likelihood (ML) channel estimation procedure 200 according to the invention is described with reference to FIG. 2. The procedure 200 performs two inverse fast Fourier transforms (IFFTs) 210–211 of size M on corresponding correlations of the combinations 215 of the detected signal $\underline{X}$ 201 and the received signal $\underline{Y}$ 202. In other words, the detected signal is correlated with itself and with the received signal. Two discrete Fourier transform (DFT) of size L 220–221 operate on the output of the IFFTs 210–211, and an inverse DFT 230 produces the channel estimate $\underline{h}$ 209 from the quotients of the DFTs 220–221.

The effect of the channel noise 155 is reduced by dropping off the outputs of the IFFT 214, 216 with indexes larger than the maximum channel length or the length of the guard interval adjacent to the OFDM symbol. Note that only the first L outputs of 210 and 211, which are lines 214 and 216, are connected to the DFTs 220 and 221. Therefore, the DFTs are only performed on the remaining outputs of the IFFT 210–211.

The steps shown in dashed block 240 can be replaced by a division of a constant C for constant modulus signals.

Let $h_l = a_l + j b_l$ be for $0 \leq l \leq L-1$. If we know the transmitted signal $\underline{X}$ 201, we can solve for $h_l$ by $$\left.\frac{\partial D(\underline{h}, \underline{X})}{\partial a_l}\right|_{\underline{h}=\hat{\underline{h}}} = 0 \quad (11)$$

$$\left.\frac{\partial D(\underline{h}, \underline{X})}{\partial b_l}\right|_{\underline{h}=\hat{\underline{h}}} = 0, \quad (12)$$

which readily lead to $$\sum_{l=0}^{L-1} \hat{a}_l \mathcal{R}\{s(k-l)\} - \sum_{l=0}^{L-1} \hat{b}_l \mathcal{F}\{s(k-l)\} = \mathcal{R}\{z(k)\}, \quad 0 \leq k \leq L-1, \quad (13)$$

and $$\sum_{l=0}^{L-1} \hat{a}_l \mathcal{F}\{s(k-l)\} + \sum_{l=0}^{L-1} \hat{b}_l \mathcal{R}\{s(k-l)\} = \mathcal{F}\{z(k)\}, \quad 0 \leq k \leq L-1, \quad (14)$$

or equivalently, $$\sum_{l=0}^{L-1} \hat{h}_l s(k-l) = z(k), \quad 0 \le k \le L-1, \quad (15)$$

where z(k) 214 and s(k) 216 are defined as the inverse Fourier transforms 210–211 of $$Z(m)=X^*(m)Y(m), \; 204 \; 0 \le m \le M-1, \text{ and} \quad (16)$$

$$S(m)=|X(m)|^2, \; 206 \; 0 \le m \le M-1 \quad (17)$$

respectively. The symbol * denotes the complex conjugate. If we take discrete Fourier transform (DFT) 220–221 of size L on both sides of equation (15), we have $$\hat{H}^{(L)}(l)S^{(L)}(l)=Z^{(L)}(l), \; 0 \le l \le L-1, \quad (18)$$

where the superscript (L) denotes the size of DFT to distinguish from the previous FFT and IFFT, which are all of size M. Thus, $\hat{H}^{(L)}$ can be obtained as the size L inverse DFT (IDFT) 230 of $Z^{(L)}(l)/S^{(L)}(l)$ for $0 \le l \le L-1$, i.e., $$\hat{h} = IDFT\left\{\frac{Z^{(L)}}{S^{(L)}}\right\}. \quad (19)$$

For constant modulus signals, we have $|X(m)|^2 = C$ for all m, where C is a constant.
Therefore, $$s(k) = \begin{cases} C, & k=0 \\ 0, & k \ne 0 \end{cases}. \quad (20)$$

In this case, from equation (15), we can directly obtain $$\hat{h}_k = z(k)/C, \; 0 \le k \le L-1. \quad (21)$$

Hence, for given $\underline{X}$, the ML estimate of the channel $\hat{h}_k$ 209 is the solution given by equation (19) or (21).

One problem is the unknown channel memory length L. However, because the system requires that the channel memory be less than the length of the guard intervals, we can set L to be the length of one guard interval, i.e., L=N.

Signal Detection

Figure 3:
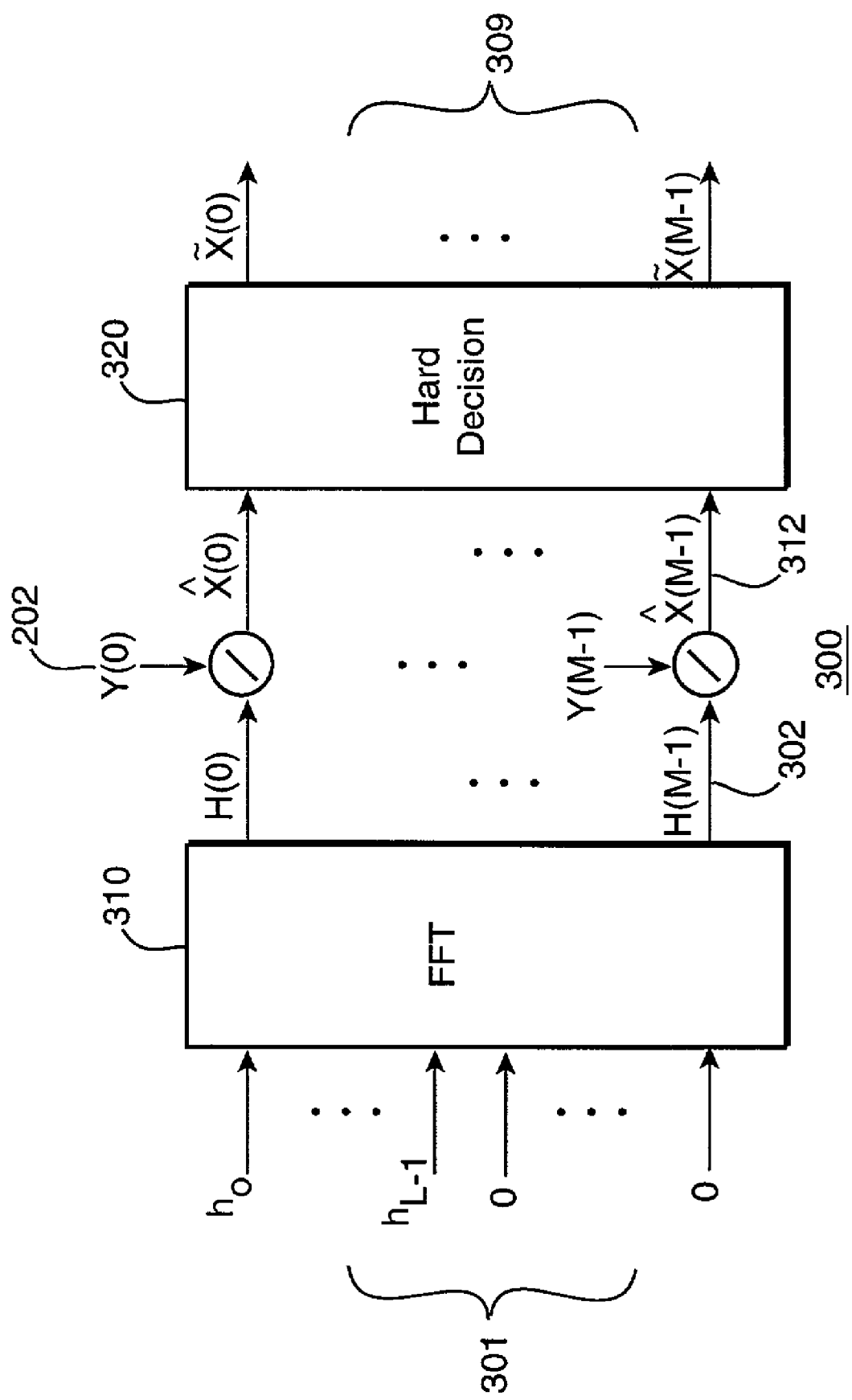
FIG. 3 is a block diagram of a signal detection procedure according to the invention.

A signal detection procedure 300 according to the invention is described with reference to FIG. 3. For a given channel impulse response $\underline{h}$ 301 or frequency response $\underline{H}$ 302 obtained from a fast Fourier transform 310, the ML estimate of the transmitted signals can be solved by $$\hat{X}(m)=\arg\min_{x=\hat{x}}\{D(\underline{h},\underline{X})\}=Y(m)/H(m), \; 0 \le m \le M-1 \quad (22)$$

The signals $\hat{X}(0), \ldots, \hat{X}(m-1)$ 312 are then passed through a hard decision block 320, which generates the estimated signals $\tilde{X}(0), \ldots, \tilde{X}(M-1)$ 309.

Description of the Overall System

Figure 4:
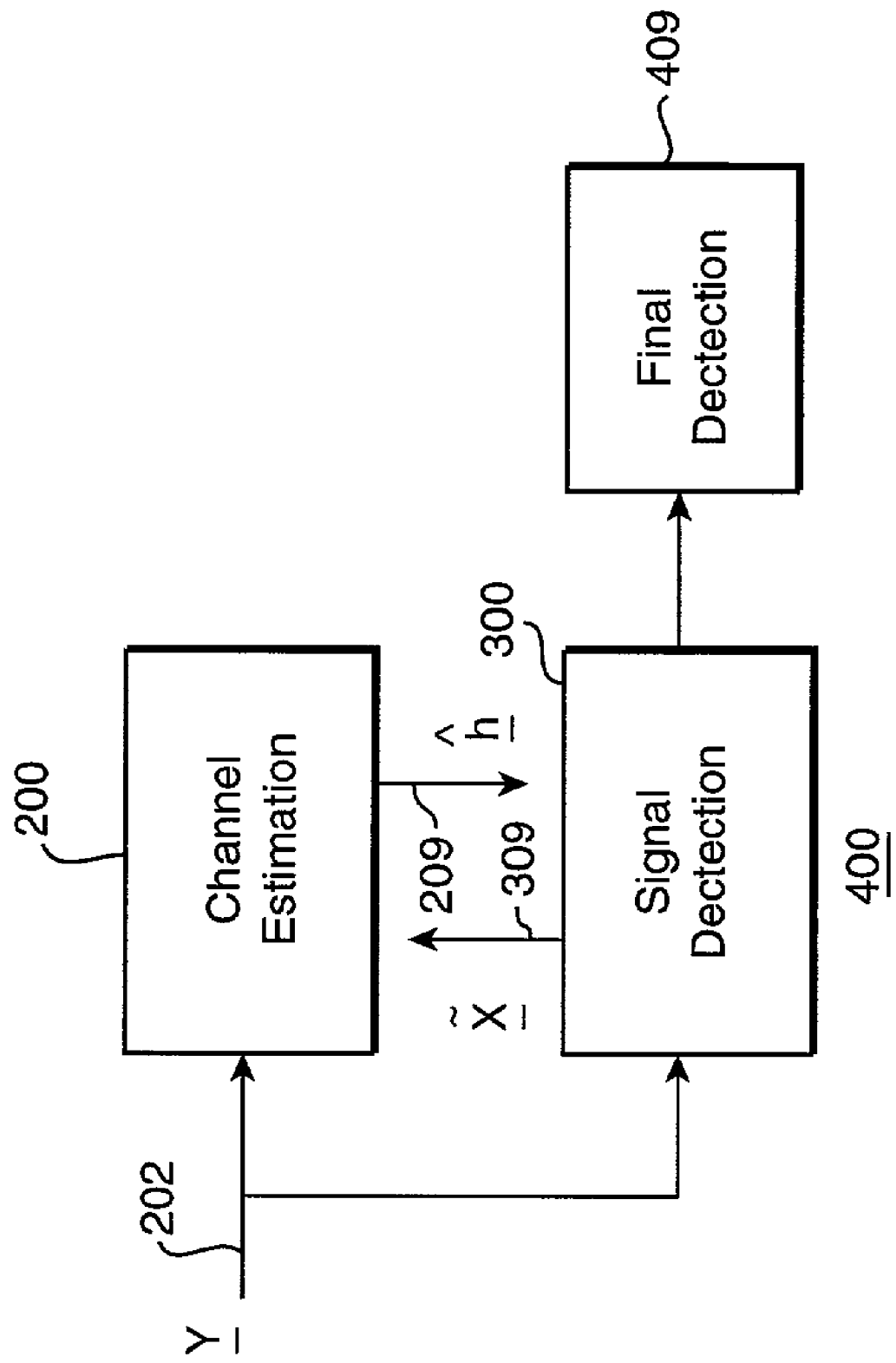
FIG. 4 is a block diagram of iterative channel estimation and signal detection according to the invention.

As shown in FIG. 4, the channel estimation 200 and signal detection 300 procedures described above can be used iteratively to form a joint channel estimation and signal detection system 400. The channel estimation and signal detection blocks shown in FIG. 4 indicate the systems shown in FIGS. 2 and 3, respectively.

A. Initial Estimate for Symbols with Pilot Signals

We can use the pilot signals to get an initial estimate $\hat{h}^{(1)}$ 209 of the impulse response of the multipath fading channel that minimizes the distance cost function $D(\underline{h}, \underline{X}^{(0)})$, i.e., $$\hat{h}^{(1)}=\arg\min_{\underline{h}}\{D(\underline{h},\underline{X}^{(0)})\}, \quad (23)$$

where the distance cost function $D(\underline{h}, \underline{X}^{(0)})$ is defined by $$D(\underline{h},\underline{X}^{(0)}) = \sum_{n=0}^{\frac{M}{4}-1} \left| Y(4n) - \sum_{l=0}^{L-1} h_l \exp^{-j2\pi\frac{nl}{\frac{M}{4}}} X(4n) \right|^2.$$

In this step, the input signals $\underline{Y}$ to channel estimation 200 are part of the received signals, i.e., Y(0), Y(4), ... Y(M–4), and the pilot signals, i.e.

$$\underline{X}^{(0)}=(X(0), X(4), \ldots X(M-4)),$$

and the IFFT 210–211 are of size M/4.

Figure 5:
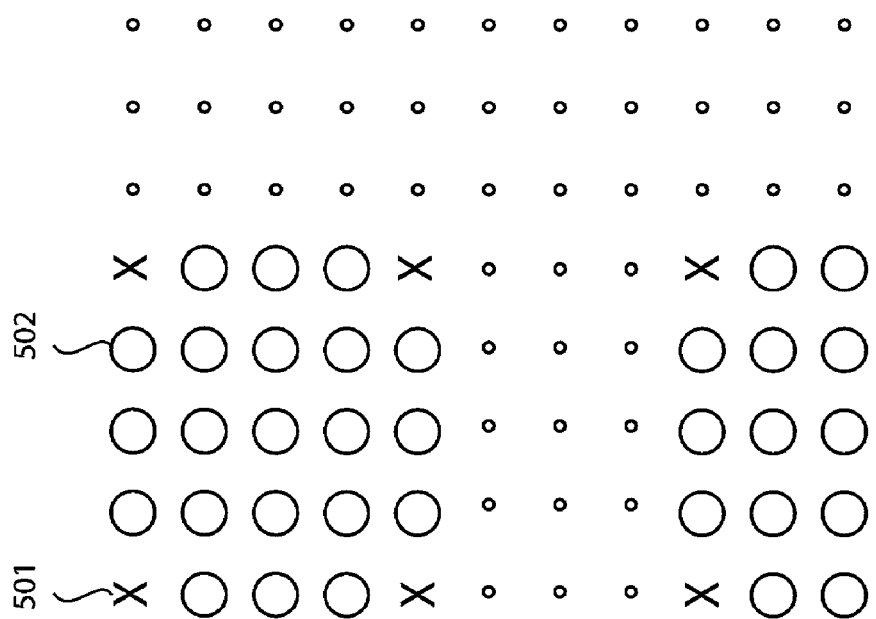
FIG. 5 is table of example transmitted OFDM symbols.

FIG. 5 shows OFDM signals with pilot signals. Each column in FIG. 5 represents an OFDM symbol, where "X" 501 indicates a pilot signal and "O" 502 represents a data signal.

B. Initial Estimation for Symbols without Pilot Signals

Set $\hat{h}^{(1)}$ 209 to be the final estimation of the impulse response of the channel obtained from the previous OFDM symbol.

Updating Steps:
For $i \ge 1$.

C. Signal Detection:

Given the initial channel estimate $\hat{h}^{(i)}$ 209, estimate the transmitted signal $\hat{X}^{(i)}$ 312 that minimizes the cost function $D(\hat{h}^{(i)}, \underline{X})$, i.e., $$\hat{X}^{(i)}=\arg\min_{\underline{x}}\{D(\hat{h}^{(i)},\underline{X})\}, \quad (24)$$

and output the hard decision $\tilde{X}^{(i)}$ 309.

D. Channel Re-estimation:

Given the estimate of the detected signal $\tilde{X}^{(i)}$ 309, update for those portions corresponding to the pilot signals and re-estimate the channel impulse response $\hat{h}^{(i+1)}$ 209 that minimizes the cost function $D(\underline{h},\tilde{X}^{(i)})$ i.e., $$\hat{h}^{(i+1)}=\arg\min_{\underline{h}}\{D(\underline{h},\tilde{X}^{(i)})\}. \quad (25)$$

E. Measure, Iterate and Terminate:

Measure the difference between two successive estimates $|\hat{h}^{(i+1)}-\hat{h}^{(i)}|$. If the difference is less than a predetermined threshold, terminate and output as a final decision the estimated transmitted symbol $\tilde{x}^{(i)}$ 409, otherwise, increment i and repeat steps C to E.

Results

Figure 6A:
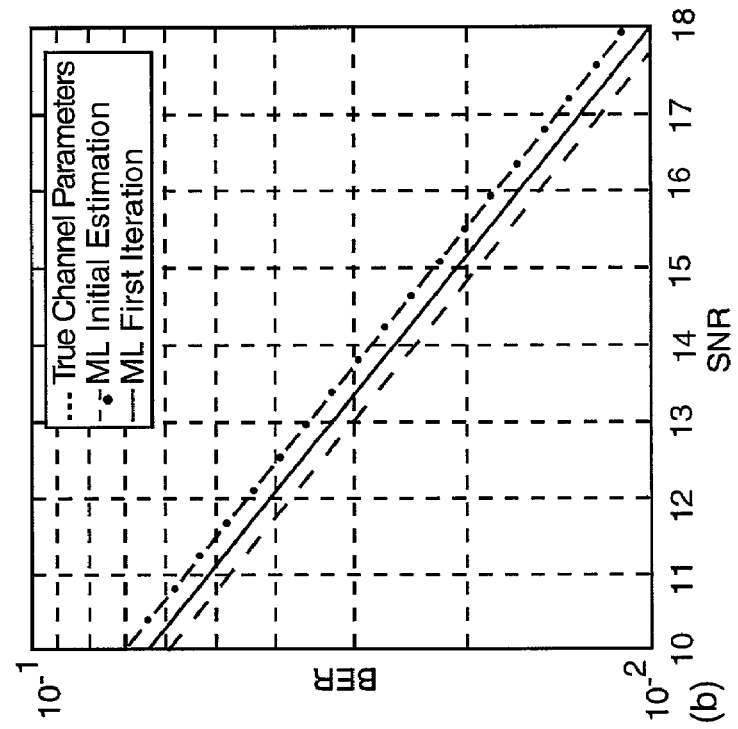
FIGS. 6a–b are graphs showing the performance of the invention in two- and three-path fading channels.
Figure 6B:
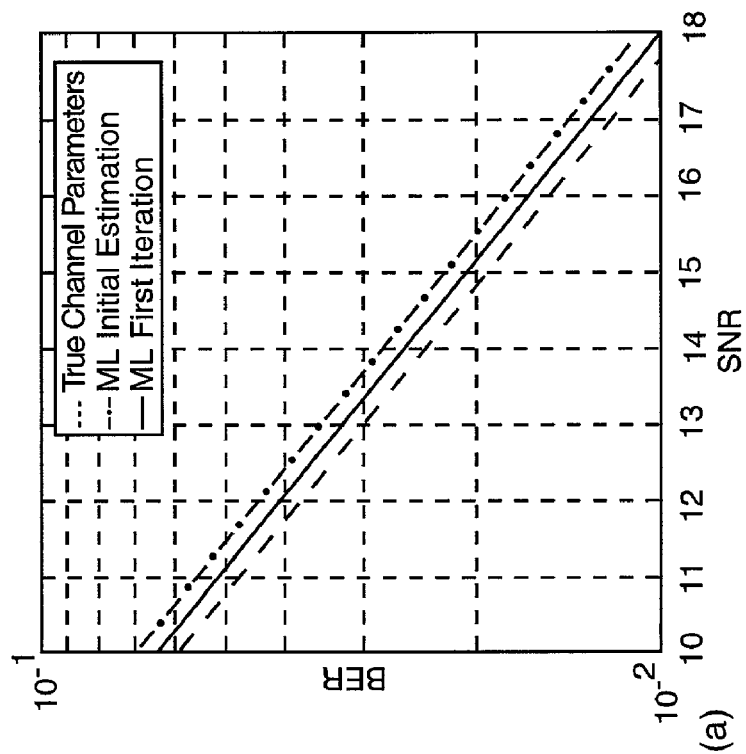

We determine the performance of our system by a simulation. In the simulation, we use 64 sub-channels with QPSK modulation on each of sub-channel. The bit error rate (BER) under a two-path slow Rayleigh fading channel, and a three-path slow Rayleigh fading channel are shown in FIGS. 6a and 6b, respectively, where the two-path and the three-path channels are $$h(z)=0.8\alpha_0 e^{j\theta_0}+0.6\alpha_1 e^{j\theta_1}z^{-1} \quad (26)$$

$$h(z)=0.408\alpha_1 e^{j\theta_0}+0.816\alpha_1 e^{j\theta_1}z^{-1}+0.408\alpha_2 e^{j\theta_2}z^{-2}, \quad (27)$$

respectively. The values $\alpha_0$, $\alpha_1$, and $\alpha_2$ are the i.i.d. random variables with Rayleigh distribution, and $\theta_0$, $\theta_1$, and $\theta_2$ are the i.i.d. random variables with uniform distribution. The BER performance is compared with ideal cases, where the channel parameters are exactly known at the receiver. FIGS. 6a–b show that after the first iteration, the BER performance of our method is within 0.3 dB of that of the ideal cases where the actual channel parameters are known.

ALTERNATIVE EMBODIMENTS

Although the described method and system according to our invention can use the pilot signals to start the iteration procedure, we do not have to rely completely on the precision of the pilot signals. In prior art, imprecise pilot signals can cause larger errors, or more iterations. The final result of our channel estimation and signal detection method mainly depends on the detected signals of the previous iteration.

A greater number of pilot signals will give a more precise initial channel estimation. However, we can relax the requirement on the number of the pilot signals, in which case we can still apply the ML technique, in exchange for more transmitted data signals and thus improved spectral efficiency.

Figure 7:
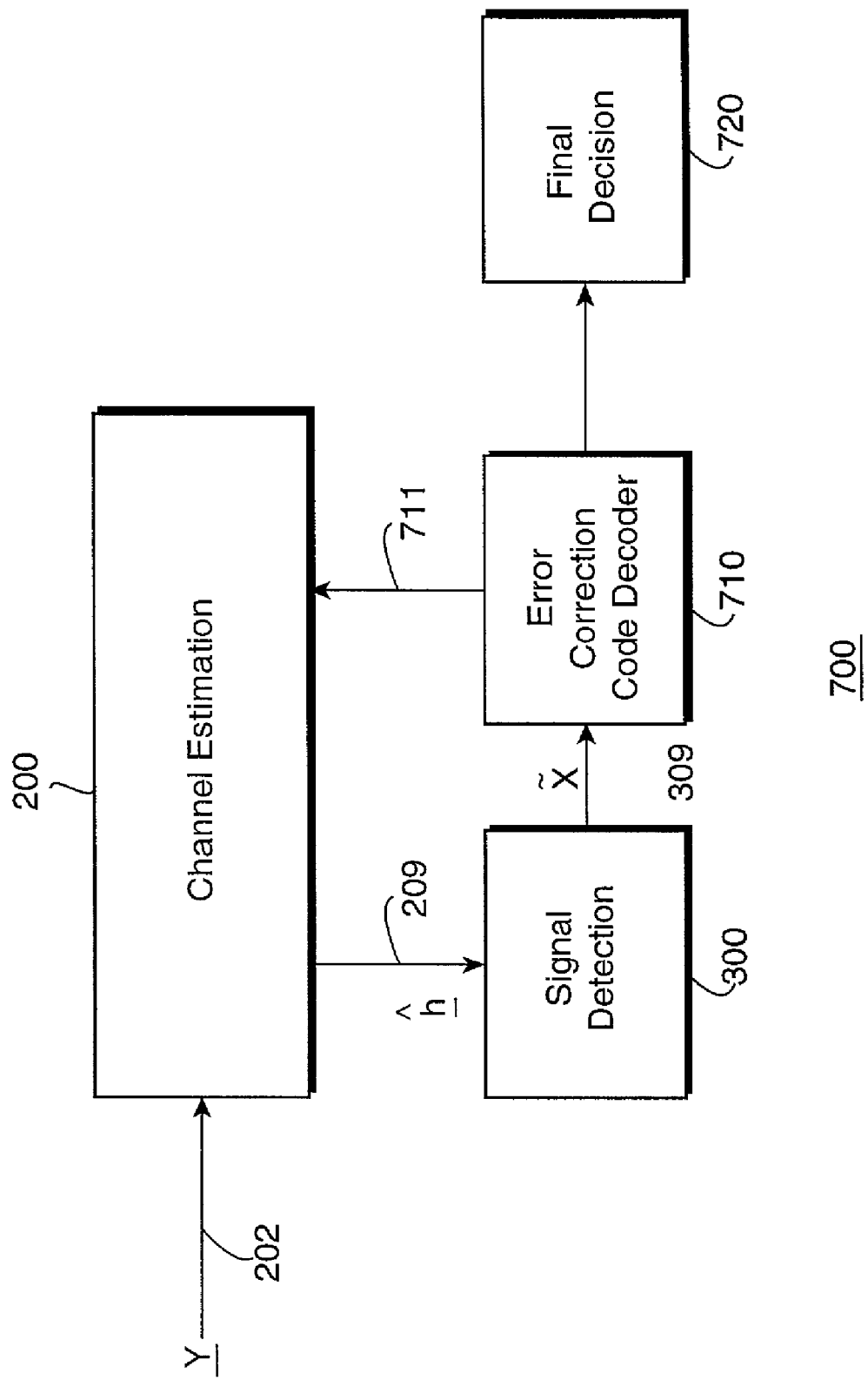
FIG. 7 is a block diagram of iterative channel estimation and signal detection with error correction codes according to the invention.

Our invention can be combined with channel error correction codes as shown in FIG. 7. The output 309 of the signal detection block 300 is used as the input to a decoding block 710 of error correction codes, and the decoding output 711 is used as the input signal to update the channel estimate 200. For systems with error correction codes, the final decision 720 of the system according to the invention is better than the case without error correction codes, because at each iteration, a much better reference signal is available for updating the estimate of the channel.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for jointly estimating a multipath fading channel and transmitted signals in an OFDM system comprising:
   estimating an initial impulse response of the multipath fading channel;
   determining an estimate of the transmitted signals using the estimated impulse response, comprising:
     performing fast Fourier transforms on the estimated impulse response;
     dividing received signals by an estimated channel frequency response output from the fast Fourier transforms; and
     making hard decisions on the quotients of the dividing step to determine the estimated transmitted signals;
   re-estimating the impulse response using the estimated transmitted signal;
   measuring a difference between two successive estimated channel impulse responses;
   repeating the determining, re-estimating and measuring steps until the difference is less than a predetermined threshold; and
   outputting a final estimated transmitted symbol.

2. The method of claim 1 further comprising:
   maximizing a joint maximum likelihood function of the impulse response and the estimated transmitted signals.

3. The method of claim 2 wherein the joint maximum likelihood function is $$f(\underline{Y}|\underline{X},\underline{h}) = \frac{1}{(2\pi\sigma^2)^M} \exp\left\{-\frac{\sum_{m=0}^{M-1}\left|Y(m) - \sum_{l=0}^{L-1} h_l \exp^{-j2\pi\frac{ml}{M}} X(m)\right|^2}{2\sigma^2}\right\},$$

where $\underline{X}$ represents the transmitted signal, $\underline{h}$ represents the impulse response of the multipath fading channel, $\underline{Y}$ represents received signals, and $\sigma^2$ represents a noise variance of the multipath fading channel having M sub-channels.

4. The method of claim 3 wherein the joint maximum likelihood function is determined by minimizing a distance cost function $$D(\underline{h},\underline{X}) = \sum_{m=0}^{M-1}\left|Y(m) - \sum_{l=0}^{L-1} h_l \exp^{-j2\pi\frac{ml}{M}} X(m)\right|^2,$$

where L is a length of a channel memory.

5. The method of claim 3 wherein the received signals are expressed as $$y(k) = \sum_{l=0}^{L-1} h_{l,k} x(k-l) + n(k),$$

where L is a length of a channel memory, k–l is the channel response at symbol time k due to an impulse applied at symbol time $k_l$, and n(k) is additive white Gaussian noise.

6. The method of claim 2 where the maximizing of the joint maximum likelihood function further comprises:
   performing a size M inverse fast Fourier transform on corresponding combinations of the detected estimate of the transmitted signals and received signals, where M is a number of sub-channels;
   performing a size L discrete Fourier transform on outputs of the inverse Fast Fourier Transform, where L is a length of a channel memory; and
   performing a size L inverse discrete Fourier transform on outputs of the discrete Fourier transform to produce the estimate of the impulse response of the channel.

7. The method of claim 6 wherein L is a length of one guard interval between successive transmitted symbols.

8. The method of claim 1 wherein the initial impulse response of the multipath fading channel is estimated from pilot signals prefixed to the transmitted symbol.

9. The method of claim 8 further comprising:
   correlating each pilot signal with itself and with corresponding received signals;
   performing an inverse fast Fourier transform of a size of the pilot signals on the correlated signals;
   dropping outputs of the inverse fast Fourier transform with indices larger than a maximum channel length to reduce an effect of noise in the multipath fading channel;
   performing a discrete Fourier transform on remaining outputs of the inverse fast Fourier transform; and processing quotients of outputs of the discrete Fourier transform to obtain the estimated impulse response of the multipath fading channel.

10. The method of claim 9 wherein the indices are larger than a guard interval adjacent the transmitted signals.

11. The method of claim 1 wherein the initial impulse response of the multipath fading channel is estimated from a previously estimated OFDM symbol.

12. The method of claim 1 further comprising:
decoding the estimate of the transmitted signals; and
updating the estimated impulse response with the decoded estimate of the transmitted signal.

13. The method of claim 1 wherein characteristics of the multipath fading channel are unknown.

14. The method of claim 1 wherein pilot signals are inserted adjacent to some but not all transmitted symbols.

15. The method of claim 1 where the estimating step further comprises:
correlating the transmitted signal with itself and with a corresponding received signal; and
performing an inverse fast Fourier transform of a size of the transmitted symbol on the correlated signals.

16. A system for jointly estimating a multipath fading channel and transmitted signals in an OFDM system comprising:
means for estimating an initial impulse response of the multipath fading channel, comprising:
a size M inverse fast Fourier transform coupled to corresponding combinations of the transmitted signals and received signals, where M is a number of sub-channels;
a size L discrete Fourier transform coupled to outputs of the inverse Fast Fourier Transform, where L is a length of a channel memory; and
a size L inverse discrete Fourier transform coupled to outputs of the discrete Fourier transform to produce the estimate of the impulse response of the channel;
means for determining an estimate of the transmitted signals using the estimated impulse response;
means for re-estimating the impulse response using the estimated transmitted signal;
means for measuring a difference between two successive estimated channel impulse responses; and
means for repeating the determining, re-estimating and measuring steps until the difference is less than a predetermined threshold, and otherwise outputting a final estimated transmitted symbol.

* * * * *